(12) United States Patent
Wang et al.

(10) Patent No.: US 7,339,480 B2
(45) Date of Patent: Mar. 4, 2008

(54) POWER PROCESSING INTERFACE FOR PASSIVE RADIO FREQUENCY IDENTIFICATION SYSTEM

(75) Inventors: Minkun Wang, Hsinchu (TW);
Chun-Lin Shen, Hsinchu (TW);
Chi-Ho Hsu, Hsinchu (TW); Chi-Bing Chen, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 466 days.

(21) Appl. No.: 11/103,062

(22) Filed: Apr. 11, 2005

(65) Prior Publication Data

US 2006/0131428 A1 Jun. 22, 2006

(30) Foreign Application Priority Data

Dec. 21, 2004 (TW) ............................... 93139920 A (51) Int. Cl.
*G08B 13/14* (2006.01)
(52) U.S. Cl. ............................... 340/572.5; 340/10.34; 340/7.32; 323/207
(58) Field of Classification Search .. 340/572.1–572.9, 340/10.34, 7.32, 693.1; 323/304, 314, 313, 323/312; 307/43
See application file for complete search history.

(56) References Cited

U.S. PATENT DOCUMENTS 6,011,488 A * 1/2000 Busser .................... 340/10.34
6,167,236 A * 12/2000 Kaiser et al. .............. 455/41.1
6,894,616 B1 * 5/2005 Forster .................... 340/572.1
7,148,661 B2 * 12/2006 Trainer et al. .............. 323/207
7,158,091 B2 * 1/2007 Pillai et al. ................. 343/860
2005/0242790 A1 * 11/2005 Kofler ........................ 323/234

* cited by examiner

Primary Examiner—Benjamin C. Lee
Assistant Examiner—Hoi C. Lau
(74) Attorney, Agent, or Firm—Volpe and Koenig, P.C.

(57) ABSTRACT

A power processing interface for a radio frequency identification system is provided. The power processing interface includes a resonance circuit for inducing a first signal transmitted from a terminal as an AC voltage, a first rectifier circuit electrically connected to the resonance circuit for converting the AC voltage into a DC voltage, a filter circuit electrically connected to the first rectifier circuit for generating an operating voltage in response to the DC voltage, a voltage-detecting circuit electrically connected to the filter circuit and the first rectifier circuit for detecting the magnitude of the operating voltage, a second rectifier circuit electrically connected to the resonance circuit, and a voltage-clamping modulation circuit electrically connected to the first rectifier circuit, the voltage-detecting circuit and the second rectifier circuit for controlling the conduction of the second rectifier circuit in response to the output of the voltage-detecting circuit so as to bypass the excessive current, and for providing a minimum voltage to the radio frequency identification system during the modulation process so as to keep the radio frequency identification system in a normal operation.

20 Claims, 7 Drawing Sheets

POWER PROCESSING INTERFACE FOR PASSIVE RADIO FREQUENCY IDENTIFICATION SYSTEM

FIELD OF THE INVENTION

The present invention relates to a power processing interface, and more particularly to a power processing interface for the passive radio frequency identification (RFID) system.

BACKGROUND OF THE INVENTION

Figure 1:
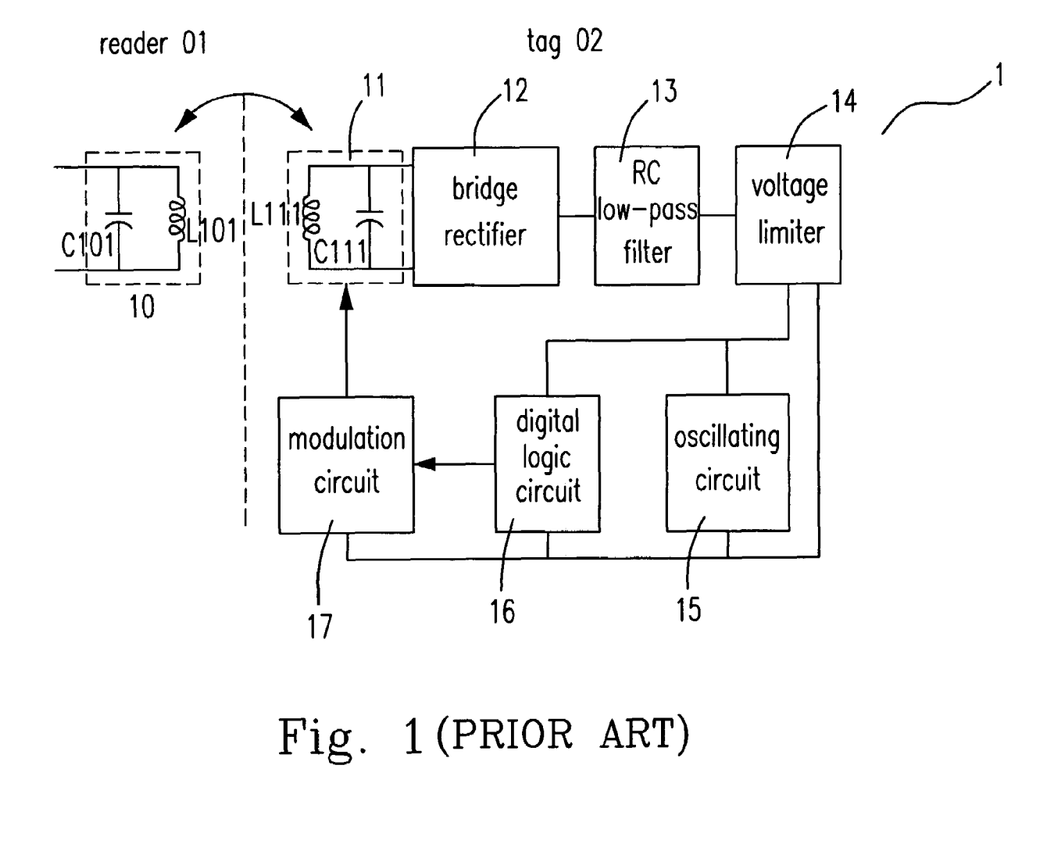
FIG. 1 is a schematic diagram showing the structure of the passive RFID system in the prior art.

Please refer to FIG. 1, which shows the structure of the passive RFID system in the prior art. The electromagnetic induction is proceeded through the inductors L101 and L111 respectively implicit in the reader 01 and the tag 02, so that the energy and information can be transmitted therebetween for being identified. The inductor L101 is implicit in the resonance circuit 10 of the reader 01, and the inductor L111 is implicit in the resonance circuit 11 of the tag 02. The fixed radio frequency carrier signal emitted from the inductor L101 of the reader 01 is induced by the inductor L111 of the tag 02 and then serves as an AC power source. After that, the AC power source is converted into a DC voltage via the bridge rectifier circuit 12, which may be a full-wave bridge rectifier circuit composed of four diodes, or a half-wave bridge rectifier circuit 12 composed of two diodes. Then, a stable DC level is obtained via the RC low-pass filter 13 which provides a required DC voltage source for the oscillating circuit 15 and the digital logic circuit 16 of the tag 02. Accordingly, a system clock pulse is produced by the oscillating circuit 15 of the tag 02 in response to the provided voltage. The data to be transmitted is encoded and then modulated and sent out via the modulation circuit 17. When received by the reader 01, the transmitted data is demodulated by a detection circuit and then sent to a microprocessor control unit (MCU). Therefore, a predetermined corresponding operation can be performed by the MCU so as to accomplish the signal transmission.

However, in the conventional passive RFID system, the tag 02 is not connected to the ground so that it is easily affected by the interference of noise. In addition, the RC low-pass filter 13 is not able to provide sufficient filtering effect due to the limitations of space and costs for the integrated circuit. Hence, a high-frequency parasitic ripple is usually generated with the provided voltage from the RC low-pass filter 13, and thus the stability of the system clock pulse is affected.

In the conventional passive RFID system, the distance between the tag 02 and the reader 01 is unfixed while they are in operation. Accordingly, the magnitude of the induced voltage is greatly affected by the distance between the tag 02 and the reader 01. The closer the tag 02 and the reader 01 are, the greater the mutual induction therebetween will be. That is, the DC voltage increases as the tag 02 moves toward the reader 01 but decreases as the tag 02 moves away from the reader 01, which results in an instability of the system. In order to overcome the above drawbacks and stabilize the passive RFID system, a voltage limiter 14 is often used in addition to the bridge rectifier 12 and the RC low-pass filter 13. The voltage limiter 14 not only stabilizes the DC voltage, but also prevents the components from being damaged due to an excessive induced voltage.

In order to save power and reduce costs, the amplitude modulation (AM) technique is often employed in the conventional RFID system to proceed the signal transmission. More specifically, the carrier signals with different amplitudes received by the tag 02 are demodulated for representing the digital logic states including DATA 0 and DATA 1. That is, the correct digital logic states DATA 0 and DATA 1 are obtained through the amplitude modulation for the carrier signals, and thus the subsequent instructions can be performed according thereto. Nevertheless, there is no active power supply in the tag 02 of the passive RFID system, so the required DC voltage needs to be generated base on the carrier amplitude rectification by the bridge rectifier 12. Therefore, the DC voltage is directly affected by the magnitude of the carrier amplitude. When the DC voltage is subject to a significant variation or the carrier amplitude is too low, which causes the DC voltage to be insufficient, the tag 02 would not be operated normally.

Similarly, when the AM technique is applied in the modulation circuit 17 of the tag 02 for the data modulation and emission, the carrier signals from the reader 01 are switched by the digital logic states DATA 0 and DATA 1 from the digital logic circuit 16. The amplitude of the carrier signal from the LC resonance circuit 11 is modified and then emitted to the reader 01. But meanwhile, the voltage output from the bridge circuit 12 is immediately affected by the amplitude of the carrier signal from the LC resonance circuit 11. Consequently, the tag 02 will be malfunctioned if the resonance circuit 11 is unable to provide the sufficient carrier amplitude. Thus, the over-degradation of the operating voltage can be avoided if a minimum voltage level for limiting the carrier amplitude is provided.

Figure 2:
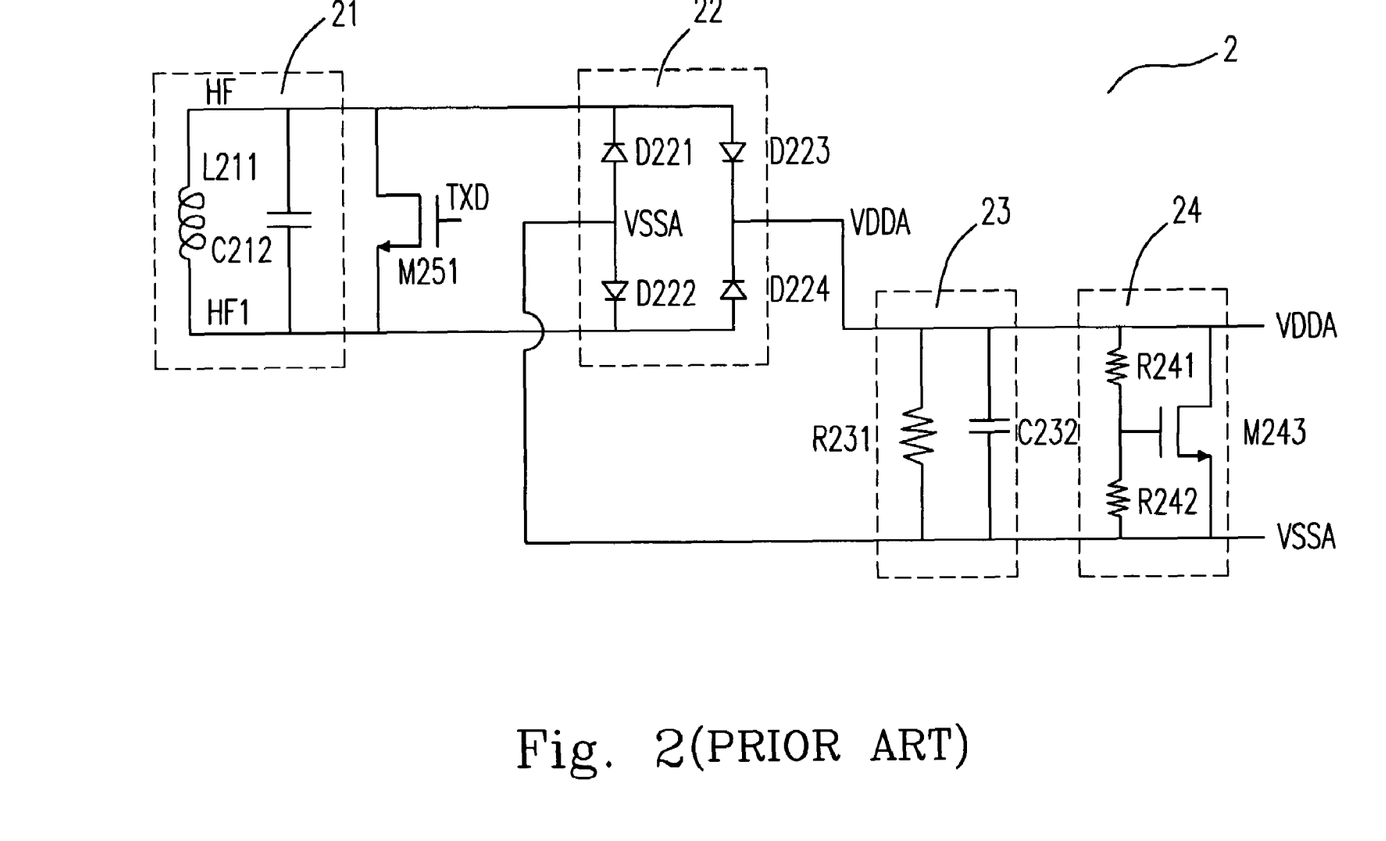
FIG. 2 is a schematic diagram showing the structure of a tag for the passive RFID system in the prior art.

Please refer to FIG. 2, which shows the structure of a tag for the passive RFID system in the prior art. As shown in FIG. 2, the carrier signal sent from the reader is induced by the inductor L211 in the LC resonance circuit 21 of the tag. At the tag, the mutual induction between the reader and the tag is proceeded through the inductors which are respectively implicit in the tag and the reader, and the induced voltage is generated accordingly. Then, the induced voltage is converted into a DC voltage via the full-wave bridge rectifier 22 composed of four diodes D221, D222, D223 and D224. Next, operating voltages VDDA and VSSA are obtained at the output of the RC low-pass filter 23, which is composed of the resistor R231 and the capacitor C232, for providing a required DC voltage for the digital logic circuit of the tag. The voltage limiter 24 is used for detecting whether the operating voltage is over-high through the voltage-dividing resistors R241 and R242 between the operating voltages VDDA and VSSA. And the transistor M243 linearly limits the increase of the operating voltage VDDA.

Firstly, the load for the operating voltage VDDA of the bridge rectifier 22 will be raised when the transistor M243 is employed to linearly limit the increase of the operating voltage VDDA. The raise of the load for the operating voltage VDDA is wasteful of the limited resource (converting efficiency) for the passive RFID system. Moreover, the load for the operating voltage VDDA would be changed when the transistor M243 is switched on or off, and this may affect the operation of the whole system. Furthermore, because the diodes D221, D222, D223 and D224 of the bridge rectifier 22 are characterized by the unidirectional rectification, higher peak voltages will occur at two ends HF and HF1 of the inductor L211 in the LC resonance circuit 21. Besides, the voltage limiter 24 cannot perform the voltage-limiting function for the LC resonance circuit 21 since the voltage limiter 24 is connected downstream of the bridge rectifier 22. Therefore, the voltage level of the voltage limiter 24 should be lowered to ensure a normal operation under the limited voltage endurance. This results in the degradation of the operating voltage for the tag, and hence the transmission distance is also reduced thereby.

Figure 3:
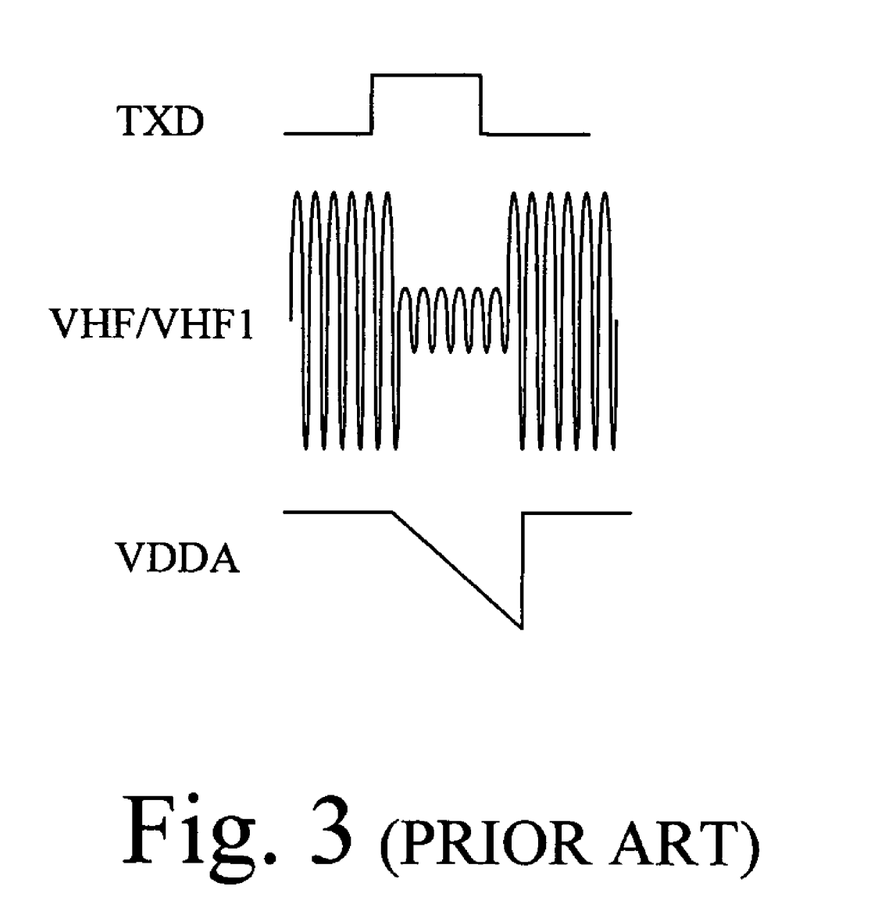
FIG. 3 shows the waveform correlation among the TXD, VHF/VHF1 and VDDA when the TXD is transmitted by the tag of FIG. 2.

As shown in FIG. 2, the AM modulation circuit M251 for the tag is disposed between two ends HF and HF1 of the inductor L211 in the LC resonance circuit 21. The voltage difference between the two ends HF and HF1 of the inductor L211 is short-circuited when the data transmitted from the modulation terminal TXD is DATA 1, which lowers the peak voltages at the two ends of HF and HF1. This causes the operating voltage VDDA from the bridge rectifier 22 to be over-low, as shown in FIG. 3, and thus the whole circuit is unable to be continuously operated.

Figure 4:
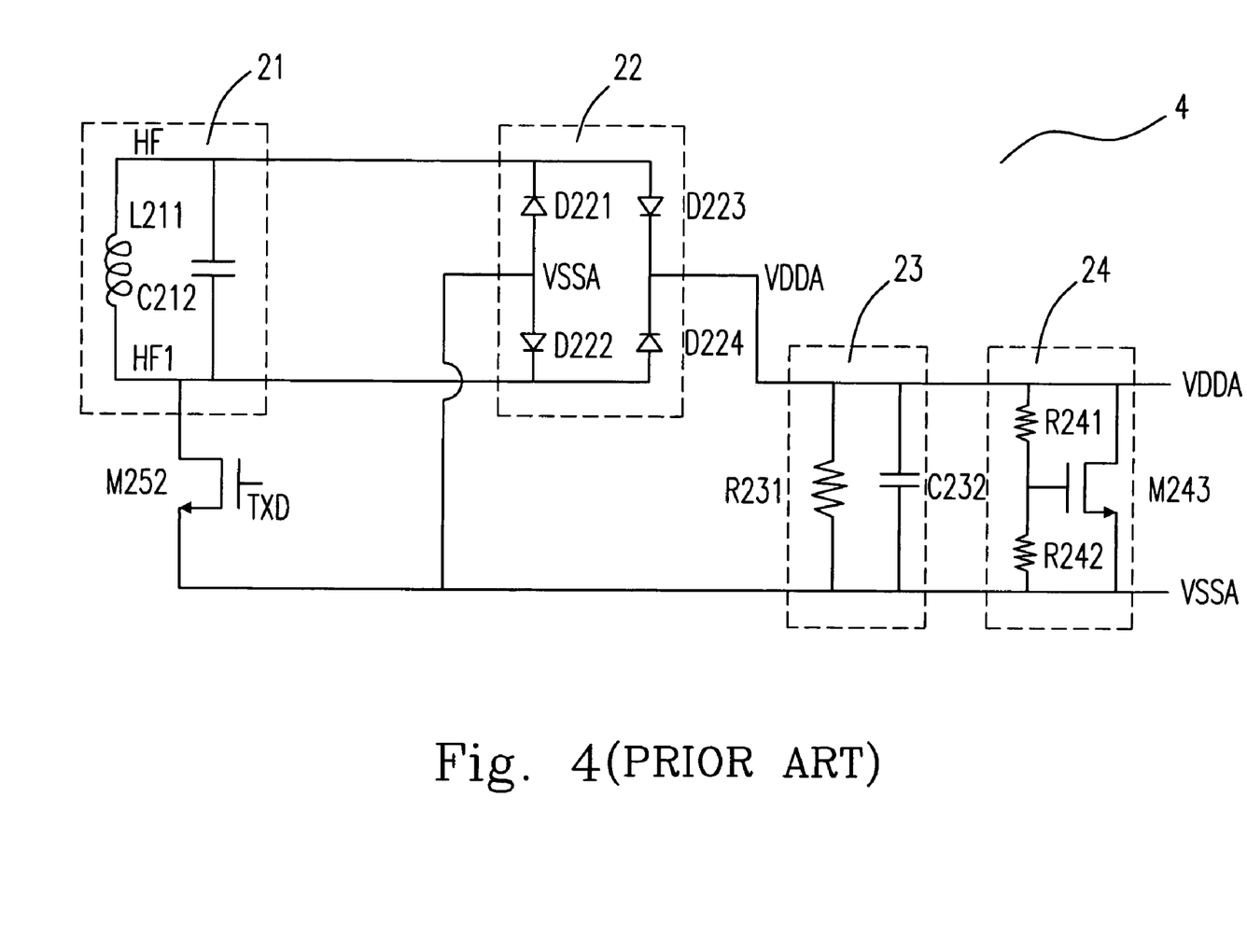
FIG. 4 is a schematic diagram showing the structure of another tag for the passive RFID system in the prior art.

Please refer to FIG. 4, which shows the structure of another tag for the passive RFID system in the prior art. As shown in FIG. 4, the modulation circuit M252 is disposed between the operating voltage VSSA of the bridge rectifier 22 and one end HF1 of the inductor L211 of the LC resonance circuit 21 for modulation. In this way, the insufficiency of the operating voltage is solved due to the unilateral modulation between the HF1 and the operating voltage VSSA. However, the induced modulation distance between the tag and the reader will be shortened, so the sensitivity of the demodulation circuit has to be strengthened for compensation.

In order to overcome the drawbacks in the prior art, a power processing interface for passive RFID is provided. The particular design in the present invention not only solves the problems described above, but also is easy to be implemented. Thus, the present invention has the utility for the industry.

SUMMARY OF THE INVENTION

In accordance with one aspect of the present invention, a power processing interface for the passive RFID is provided. The power processing interface is used for providing a stable operating voltage to the tag of the passive RFID during the data modulation and demodulation processes.

In accordance with another aspect of the present invention, a power processing interface for the passive RFID is provided. The power processing interface is able to provide an effective minimum operating voltage during the modulation process, so that the over-degradation of the operating voltage can be avoided.

In accordance with a further aspect of the present invention, a power processing interface for a radio frequency identification system is provided. The power processing interface includes a resonance circuit for inducing a first signal transmitted from a terminal as an AC voltage, a first rectifier circuit electrically connected to the resonance circuit for converting the AC voltage into a DC voltage, a filter circuit electrically connected to the first rectifier circuit for generating an operating voltage in response to the DC voltage, a voltage-detecting circuit electrically connected to the filter circuit and the first rectifier circuit for detecting the magnitude of the operating voltage, a second rectifier circuit electrically connected to the resonance circuit, and a voltage-clamping modulation circuit electrically connected to the first rectifier circuit, the voltage-detecting circuit and the second rectifier circuit for controlling the conduction of the second rectifier circuit in response to the output of the voltage-detecting circuit so as to bypass the excessive current, and for providing a minimum voltage to the radio frequency identification system during the modulation process so as to keep the radio frequency identification system in a normal operation.

Preferably, the radio frequency identification system is a passive radio frequency identification system Preferably, the terminal is one of a reader and a tag.

Preferably, the resonance circuit includes an inductor and a capacitor in parallel.

Preferably, the first rectifier circuit is electrically connected in parallel to the resonance circuit.

Preferably, the first rectifier circuit is a bridge rectifier circuit.

Preferably, the bridge rectifier circuit includes four diodes.

Preferably, the filter circuit includes a resistor and a capacitor in parallel.

Preferably, the voltage-detecting circuit is electrically connected in parallel to the first rectifier circuit.

Preferably, the voltage-clamping modulation circuit further includes a power-controlling device electrically connected to the voltage-detecting circuit and the resonance circuit for controlling the conduction of the second rectifier circuit.

Preferably, the power-controlling device is a metal oxide semiconductor (MOS) transistor.

Preferably, the voltage-clamping modulation circuit includes a modulation device for receiving a second signal and being electrically connected to the resonance circuit for modulating the amplitude of the second signal.

Preferably, the modulation device is a metal oxide semiconductor transistor.

Preferably, the voltage-clamping modulation circuit includes a clamping circuit for conducting the second rectifier circuit though one of the power-controlling device and the modulation device so as to clamp the amplitude of the first signal.

Preferably, the clamping circuit has the minimum voltage provided by a plurality of diodes in series.

Preferably, the clamping circuit has the minimum voltage provided by a plurality of transistors in series.

Preferably, the second rectifier circuit is electrically connected to the voltage-clamping modulation circuit and the resonance circuit.

Preferably, the second rectifier circuit is a bridge rectifier circuit.

Preferably, the bridge rectifier circuit includes four diodes.

Preferably, the second rectifier circuit shares two of the diodes with the first rectifier circuit, in which the two diodes are grounded in the first rectifier circuit.

In accordance with further another aspect of the present invention, a power processing interface for a radio frequency identification system is provided. The power processing interface includes a resonance circuit for inducing a first signal transmitted from a terminal as an AC voltage, a first rectifier circuit electrically connected to the resonance circuit for converting an AC voltage into a DC voltage, and a second rectifier circuit electrically connected to the resonance circuit, wherein the second rectifier circuit is conducted in response to the DC voltage so as to bypass the excessive current.

In accordance with further another aspect of the present invention, a power processing interface for a radio frequency identification system is provided. The power processing interface includes a first rectifier circuit for converting an AC voltage into a DC voltage, a voltage-detecting circuit electrically connected to the first rectifier circuit for detecting the magnitude of the DC voltage, a voltage-clamping modulation circuit electrically connected to the first rectifier circuit and the voltage-detecting circuit for providing a minimum voltage to the radio frequency identification system during the modulation process so as to keep the radio frequency identification system in a normal operation.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention provides a stable operating voltage for the tag of the passive RFID system during the data modulation and demodulation processes. In the conventional tag structure shown in FIG. 4, the voltage limiter 24 includes two resistors R241 and R242 and a transistor M243. The two resistors R241 and R242 are used as the voltage detecting components for over-voltage detection, and the transistor M243 is used as the voltage-limiting limited component for voltage limitation. In the present invention, the position of the voltage detecting components R241 and R242 remains the same to detect the operating voltage VDDA, while the voltage limiting component M243 is connected upstream of the bridge rectifier 22. Therefore, an effective closed loop is formed so as to detect the variation of the output VDDA of the bridge rectifier 22 and directly control the peak voltages of the HF and HF1 of the LC resonance circuit 21.

Figure 5:
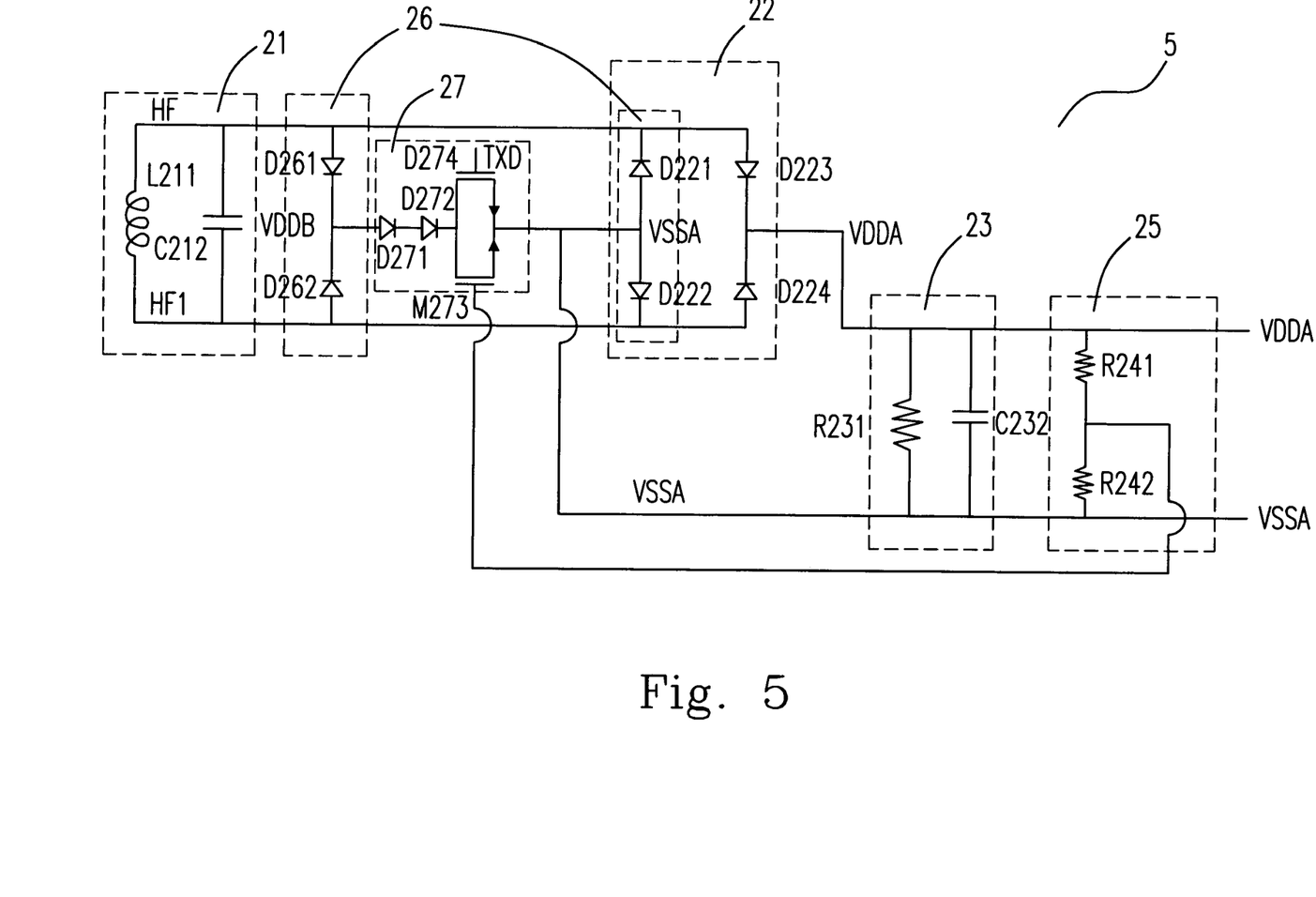
FIG. 5 is a schematic diagram showing the structure of the tag for the passive RFID according to a preferred embodiment of the present invention.

Please refer to FIG. 5, which shows the structure of the tag for the passive RFID according to a preferred embodiment of the present invention. The tag 5 includes an LC resonance circuit 21, a first bridge rectifier circuit 22, a RC low-pass filter 23, a voltage-detecting circuit 25, a second bridge rectifier circuit 26 and a voltage-clamping modulation circuit 27. As shown in FIG. 5, besides the original bridge rectifier 22, which is referred to as the first bridge rectifier circuit 22 in the following descriptions, a second bridge rectifier circuit 26 is added thereinto. The first bridge rectifier circuit 22 shares the diodes D221 and D222 with the second bridge rectifier circuit 26. That is, the first bridge rectifier circuit 22 consists of the diodes D221, D222, D223 and D224, while the second bridge rectifier circuit 26 consists of the diodes D221, D222, D261 and D262. The shared diodes D221 and D222 serves as the common ground for the first bridge rectifier circuit 22 or the second bridge rectifier circuit 26, so as to prevent the two bridge rectifier circuits 22 and 26 from having their respective grounds. Moreover, the voltage-clamping modulation circuit 27 consists of the diodes D271, D272, M273 and M274 for controlling the conduction of the second bridge rectifier circuit 26.

In the present invention, the resistor R241 is connected with the resistor R242 to form a voltage-detecting circuit 25. The on and off of the voltage-clamping modulation circuit 27 is controlled by the output of the voltage-detecting circuit 25 which is subject to the variation of the operating voltage VDDA. When the operating voltage VDDA is too high, the power-controlling transistor M273 of the voltage-clamping modulation circuit 27 is conducted so that the amount of current for conducting the second bridge rectifier circuit 26 is determined. Meanwhile, the load for the operating voltages VDDA and VSSA of the first bridge rectifier circuit 22 remains the same. The increased load will be sustained by the second bridge rectifier circuit 26. That is, the excessive current is bypassed via the second bridge rectifier circuit 26 without affecting the load for the first bridge rectifier circuit 22, so that the operating voltage VDDA is not affected as well.

Besides, the LC resonance circuit 21, the first bridge rectifier circuit 22, the RC low-pass filter 23, the voltage-detecting circuit 25, the second bridge rectifier circuit 26 and the voltage-clamping modulation circuit 27 construct an effective closed loop in the tag 5.

In addition, the power stability will be affected while the data modulation for the tag is performed. Therefore, it is desirable that an effective operating voltage is provided during the data modulation process via the operating voltage VDDA of the first bridge rectifier circuit 22, so as to keep the tag in a normal operation.

As shown in FIG. 5, the modulation transistor M274 of the voltage-clamping modulation circuit 27 is conducted when the data modulation for the tag is performed. In this way, the peak voltage between the HF and HF1 of the LC resonance circuit 21 can still be kept at a value larger than the voltage difference between the diodes D271 and D272. This keeps the tag in a normal operation. Thus, the tag would not be malfunctioned due to the over-low peak voltage between the HF and HF1.

Figure 6:
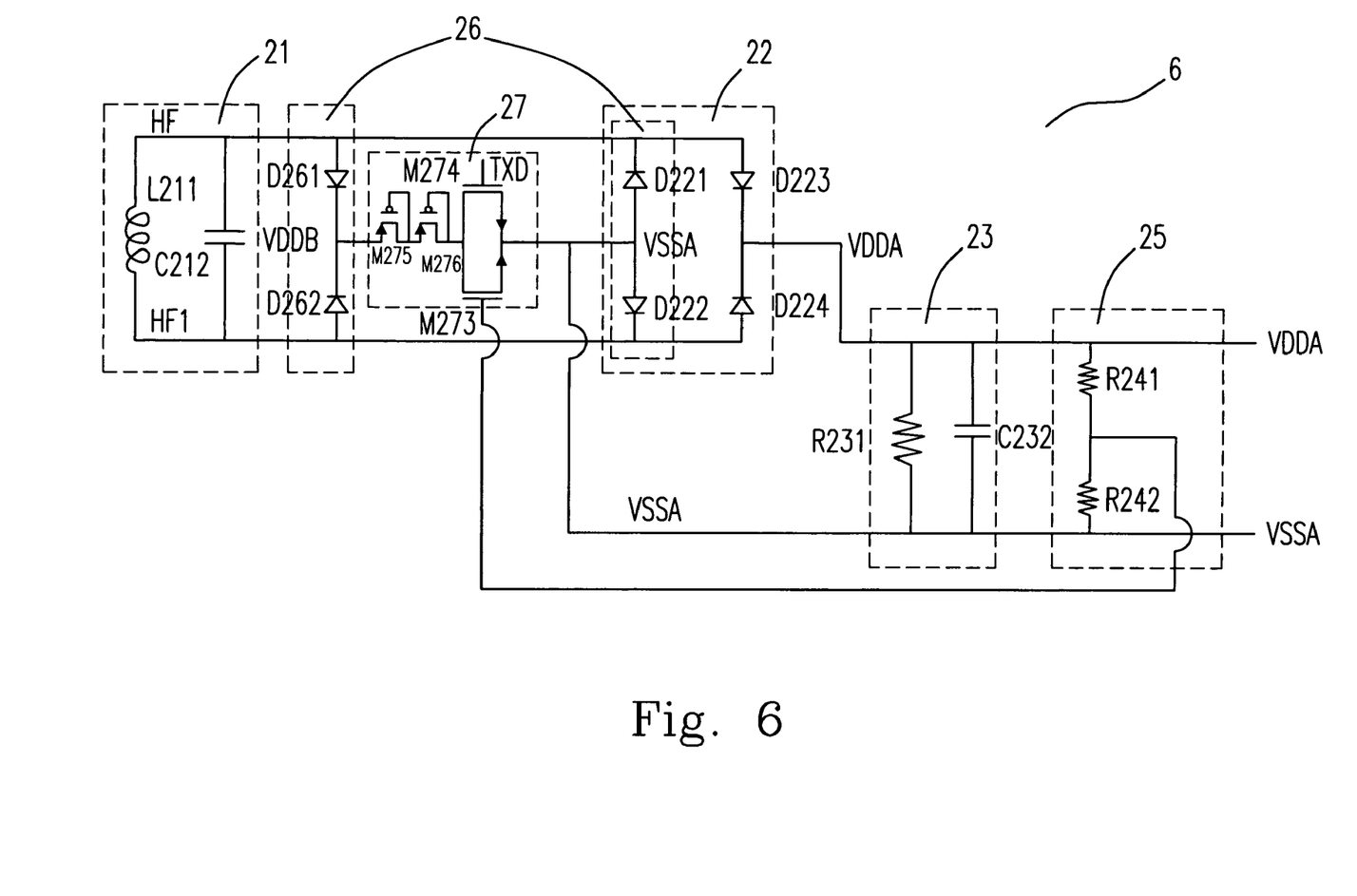
FIG. 6 is a schematic diagram showing the structure of the tag for the passive RFID according to another preferred embodiment of the present invention.

Please refer to FIG. 6, which shows the structure of the tag for the passive RFID according to another preferred embodiment of the present invention. As shown in FIG. 6, the diodes D271 and D272 of FIG. 5 can be replaced with the PMOS transistors M275 and M276 according to actual needs.

Figure 7:
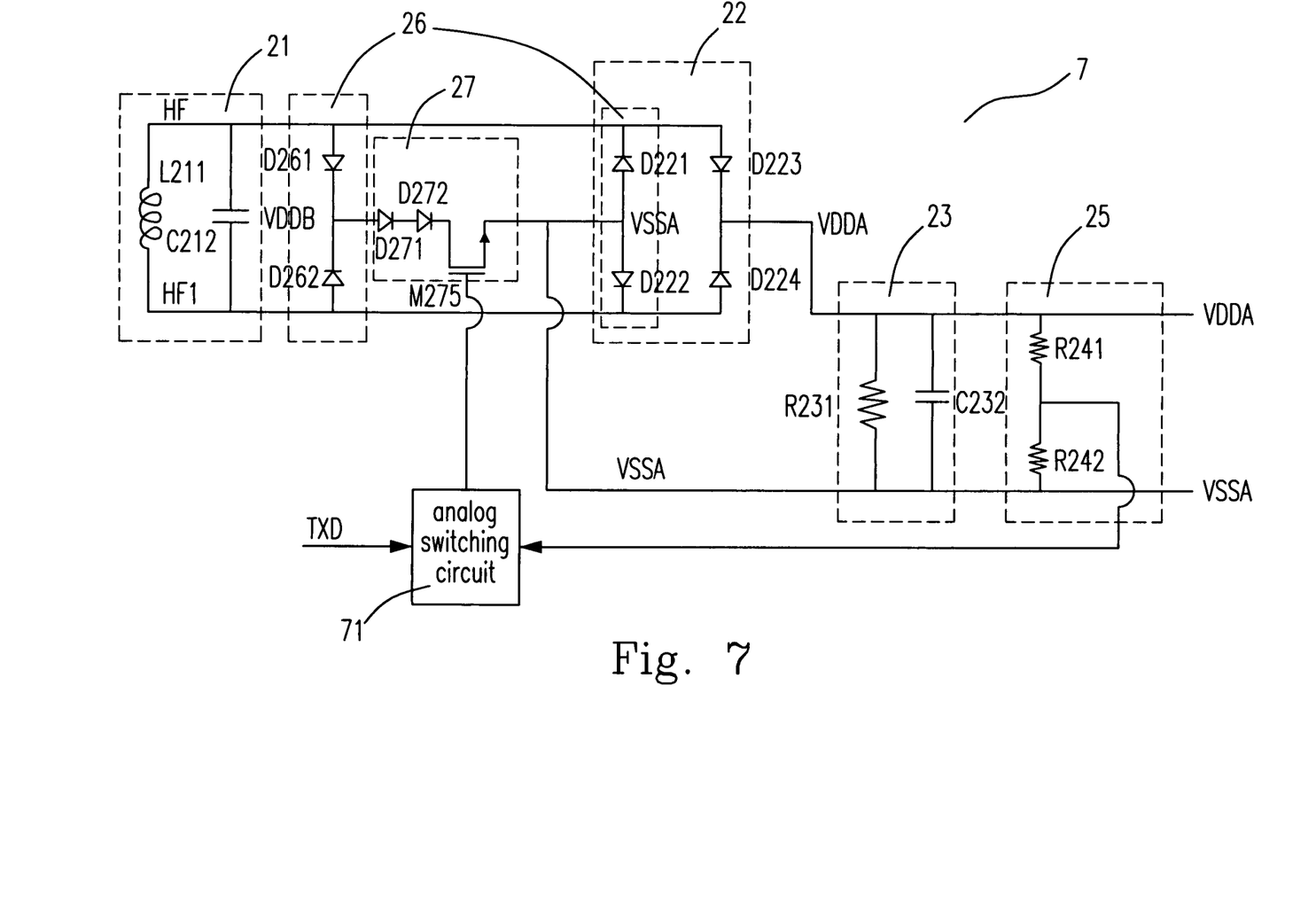
FIG. 7 is a schematic diagram showing the structure of the tag for the passive RFID according to a further preferred embodiment of the present invention.

In FIG. 5, the power-controlling transistor M273 of the voltage-clamping modulation circuit 27 is operated in its linear region and cutoff region, while the modulation transistor 274 is operated in its cutoff region and saturation region. The power-controlling transistor M273 and the modulation transistor M274 can be replaced with the combination of an analog switching circuit 71 and a transistor M275, as shown in FIG. 7. Besides, the present invention is not only applied to the tag of the passive RFID system but applied to the reader thereof.

In conclusion, the present invention provides a stable operating voltage for the tag of the passive RFID during the data modulation and demodulation processes. In the meantime, the present invention also provides an effective minimum operating voltage during the modulation process, so that the over-degradation of the operating voltage can be avoided. Accordingly, the present invention can effectively solve the problems and drawbacks in the prior art, and thus it fits the demand of the industry and is industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A power processing interface for a radio frequency identification system, comprising:
    a resonance circuit for inducing a first signal transmitted from a terminal as an AC voltage;
    a first rectifier circuit electrically connected to said resonance circuit for converting said AC voltage into a DC voltage;
    a filter circuit electrically connected to said first rectifier circuit for generating an operating voltage in response to said DC voltage;
    a voltage-detecting circuit electrically connected to said filter circuit and said first rectifier circuit for detecting a magnitude of said operating voltage;
    a second rectifier circuit electrically connected to said resonance circuit; and
    a voltage-clamping modulation circuit electrically connected to said first rectifier circuit, said voltage-detecting circuit and said second rectifier circuit for controlling a conduction of said second rectifier circuit in response to an output of said voltage-detecting circuit so as to bypass an excessive current, and for providing a minimum voltage to said radio frequency identification system during a modulation process so as to keep said radio frequency identification system in a normal operation.

2. The power processing interface as claimed in claim 1, wherein said radio frequency identification system is a passive radio frequency identification system.

3. The power processing interface as claimed in claim 1, wherein said terminal is one of a reader and a tag.

4. The power processing interface as claimed in claim 1, wherein said resonance circuit comprises an inductor and a capacitor in parallel.

5. The power processing interface as claimed in claim 1, wherein said first rectifier circuit is electrically connected in parallel to said resonance circuit.

6. The power processing interface as claimed in claim 1, wherein said first rectifier circuit is a bridge rectifier circuit.

7. The power processing interface as claimed in claim 6, wherein said bridge rectifier circuit comprises four diodes.

8. The power processing interface as claimed in claim 1, wherein said filter circuit comprises a resistor and a capacitor in parallel.

9. The power processing interface as claimed in claim 1, wherein said voltage-detecting circuit is electrically connected in parallel to said first rectifier circuit.

10. The power processing interface as claimed in claim 1, wherein said voltage-clamping modulation circuit further comprises a power-controlling device electrically connected to said voltage-detecting circuit and said resonance circuit for controlling said conduction of said second rectifier circuit.

11. The power processing interface as claimed in claim 10, wherein said power-controlling device is a metal oxide semiconductor (MOS) transistor.

12. The power processing interface as claimed in claim 1, wherein said voltage-clamping modulation circuit comprises a modulation device for receiving a second signal and being electrically connected to said resonance circuit for modulating an amplitude of said second signal.

13. The power processing interface as claimed in claim 12, wherein said modulation device is a metal oxide semiconductor transistor.

14. The power processing interface as claimed in claim 1, wherein said voltage-clamping modulation circuit comprises a clamping circuit for conducting said second rectifier circuit through one of said power-controlling device and said modulation device so as to clamp an amplitude of said first signal.

15. The power processing interface as claimed in claim 14, wherein said clamping circuit has said minimum voltage provided by a plurality of diodes in series.

16. The power processing interface as claimed in claim 14, wherein said clamping circuit has said minimum voltage provided by a plurality of transistors in series.

17. The power processing interface as claimed in claim 1, wherein said second rectifier circuit is electrically connected to said voltage-clamping modulation circuit and said resonance circuit.

18. The power processing interface as claimed in claim 1, wherein said second rectifier circuit is a bridge rectifier circuit.

19. The power processing interface as claimed in claim 18, wherein said bridge rectifier circuit comprises four diodes.

20. The power processing interface as claimed in claim 19, wherein said second rectifier circuit shares two of said diodes with said first rectifier circuit, in which said two diodes are grounded in said first rectifier circuit.

* * * * *